Figures 1, 2, 3, 4:
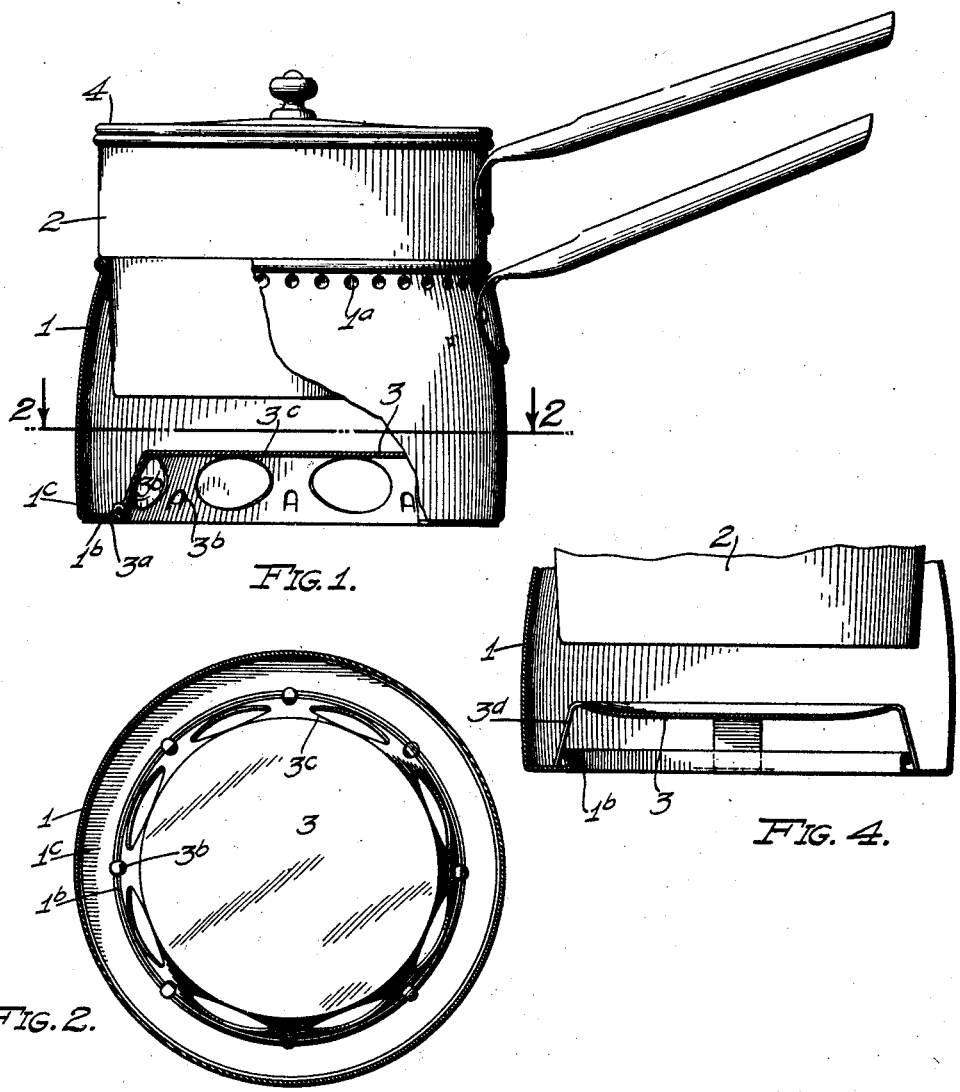

Jan. 8, 1929.

W. R. DICK 1,698,225

COOKING UTENSIL

Filed Sept. 22, 1924

Inventor

WILLIAM R. DICK.

By A. B. Bowman

Attorney

Patented Jan. 8, 1929.

1,698,225

UNITED STATES PATENT OFFICE.

WILLIAM R. DICK, OF SAN DIEGO, CALIFORNIA.

COOKING UTENSIL.

Application filed September 22, 1924. Serial No. 739,047.

My invention relates to cooking utensils, and the objects of my invention are: first, to provide a utensil for cooking, roasting and the like, whereby the flame and heat from the burner over which the same is adapted to be positioned is indirectly applied to the bottom portion of the cooking or roasting receptacle; second, to provide a utensil of this class having a pair of receptacles, the one positioned within the other, and whereby the heat from the burner over which the utensil is adapted to be positioned is conducted through openings in the lower receptacle indirectly against the bottom and lower side walls of the other receptacle positioned in the former; third, to provide a utensil of this class having a receptacle provided with a raised bottom at its middle portion and openings at the side portions of the raised bottom through which heat is indirectly conducted to the bottom and lower side walls of a cooking receptacle positioned in the former; fourth, to provide a utensil of this class having a pair of receptacles, the one positioned within the other, said other receptacle being provided with openings in its bottom and upper portions of its side walls, whereby substantially the whole bottom and side walls of the receptacle positioned therein are indirectly subjected to the heat of the flame from the burner over which the utensil is adapted to be positioned; fifth, to provide a utensil of this class whereby the flame or heat from the flame of the burner over which the utensil is adapted to be positioned is directly against substantially the whole bottom and side walls of a cooking or roasting receptacle; sixth, to provide a novelly constructed utensil of this class, and seventh, to provide such a utensil which is very simple and economical of construction, durable, efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of my cooking utensil in one form of construction, with certain parts and portions thereof broken away and in section to facilitate the illustration; Fig. 2 is a transverse sectional view thereof, taken through 2—2 of Fig. 1; Fig. 3 is a fragmentary view of a slightly modified form of construction of the upper portion or edge of the lower receptacle, and Fig. 4 is a fragmentary elevational view of a slightly modified form of construction of the lower portion of the outer or lower receptacle, showing certain parts and portions thereof and the receptacle positioned therein in elevation to facilitate the illustration.

Like characters of reference refer to similar parts and portions throughout the several views of the drawings.

In the one form of construction of my utensil, as shown in Figures 1 and 2 of the drawings, the general contours of the lower, heat diverting supporting receptacle 1, the cooking or roasting receptacle 2 adapted to be positioned in the upper portion of the receptacle 1, and the cover 4, are substantially the same as those of the conventional double boiler. The bottom, however, of the receptacle 1 is raised at its middle portion, which serves to accumulate the heat of the burner over which the utensil is positioned, and is provided at the side portions of the raised bottom with openings, whereby the heat is directed against the bottom and lower side walls of the receptacle 2 within the receptacle 1. Near the upper edge of the side walls of the receptacle 1 is provided a plurality of perforations 1ª, which permit the heat within the receptacle 1 to be directed outwardly therefrom and upwardly against the upper portions of the side walls of the receptacle 2.

When the lower receptacle 1 is made from a light gage tinned metal or from aluminum, the middle portion of the bottom is preferably made from a heavier gage steel in the form of an inverted pan, as indicated by 3 in Fig. 1. With this construction a portion of the bottom of the receptacle 1 is cut out and slightly raised at its inner edge, as indicated by 1ᵇ in Fig. 1. The bottom member 3 is preferably provided with a large flange 3ª at its lower end which extends substantially over the remaining bottom portion 1ᶜ of the receptable 1. The side wall portions of the bottom member 3 are preferably punched out, as indicated by 3ᵇ, and turned outwardly and over the upwardly extending flange 1ᵇ of the receptacle 1, thus securing the bottom member 3 to the bottom portion of the receptacle 1. In the side walls of the bottom member 3 are also provided large openings 3ᵉ to permit as much heat as possible to be conducted into the interior of the receptacle 1 against the bottom and side walls of the receptacle 2.

In the modified form of construction of the upper portion of the receptacle 1, as shown in Fig. 3 of the drawings, I have shown the upper edge corrugated, as indicated by 1ᵈ, to permit the heat from the interior of the receptacle 1 to escape through the openings formed by the corrugations 1ᵈ and the outside walls of the receptacle 2, thus permitting the heat from the interior of the receptacle 1 to pass outwardly at its upper portion in closer proximity to the upper portion of the side walls of the receptacle 2 instead of outwardly and upwardly, as shown in Fig. 1.

In the modified form of construction of the bottom portion of the receptacle 1, as shown in Fig. 4 of the drawings, the bottom of the receptacle 1 is also cut out and turned upwardly, as indicated by 1ᵇ, and preferably reinforced at said upwardly turned portion. In this modified form of construction, the bottom member 3 is provided with outwardly and downwardly extending legs 3ᵈ, which are loosely positioned at their lower ends in the bottom portion or channel-shaped portion at the bottom of the receptacle 1, so that the bottom member 3 may be easily removed from the bottom of the receptacle 1 when desired. The middle plate portion of the bottom member 3 is also preferably curved at its outer edges to permit the maximum of heat to be directed into the interior of the receptacle 1.

It is obvious from this construction, as illustrated in the drawings and disclosed in the foregoing specification, that there is provided a utensil for cooking, roasting and the like, as aimed at and set forth in the objects of the invention, and though I have shown and described a particular construction, combination and arrangement of parts and portions and certain modifications thereof, I do not wish to be limited to this particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In a utensil of the class described, a receptacle having a raised, substantially flat middle bottom portion and openings at the sides of said raised bottom portion, said openings being adapted to permit heated gases from the bottom side of said receptacle to be conducted to the interior thereof, and another receptacle positioned partially within said first mentioned receptacle with its bottom spaced a considerable distance from the raised bottom portion of said first mentioned receptacle and the whole thereof being adapted to be subjected to said heated gases, said raised middle bottom portion being of substantially the area of the bottom of the last mentioned receptacle.

2. In a utensil of the class described, a receptacle having a raised, substantially flat middle bottom portion and openings at the sides of said raised bottom portion, said openings being adapted to permit heated gases from the bottom side of said receptacle to be conducted to the interior thereof, and another receptacle positioned partially within said first mentioned receptacle with its bottom spaced a considerable distance from the raised bottom portion of said first mentioned receptacle and the whole thereof being adapted to be subjected to said heated gases, said raised middle bottom portion being of substantially the area of the bottom of the last mentioned receptacle, the upper portions of the side walls of said first mentioned receptacle being provided with a plurality of ports contiguous to the side walls of the receptacle adapted to be positioned therein adapted to permit the heated gases from the interior of said first mentioned receptacle to be conducted to the upper portions of the side walls of the receptacle positioned therein.

3. In a cooking utensil, an outer receptacle having a raised middle bottom portion and openings at the sides of said portion, the area of said raised portion approximating that of a cook-stove burner whereby the flame from the burner will project directly into said area, and an inner receptacle adapted to removably rest on the upper edge of the outer receptacle, the side walls and bottom of said inner receptacle being respectively spaced from the side walls and raised bottom portion of the outer receptacle, there being openings to the atmosphere at the top of the outer receptacle smaller than said first mentioned openings whereby the heat current from the burner passing up through said first mentioned openings will be retarded in its passage from around the inner receptacle.

4. In a cooking utensil, an outer receptacle having a raised middle bottom portion and openings at the side of said portion, the area of said raised bottom portion approximately that of a cook-stove burner whereby the flame from the burner will project directly into said area, and an inner receptacle adapted to removably rest on the upper edge of the outer receptacle, the side walls and bottom of said inner receptacle being respectively spaced from the side walls and raised bottom portion of the outer receptacle, said side openings being in a substantially vertical plane and the area of the raised bottom portion of the outer receptacle approaching that of the bottom of the inner receptacle, whereby the flame from the burner passing through the openings will not tend to come into direct contact with the bottom and side walls of the inner receptacle.

5. In a utensil of the class described, an outer supporting receptacle having a substantially vertical outer side wall provided with an inwardly turned, horizontal supporting flange at its lower edge, a raised bottom member positioned within the outer supporting receptacle consisting of an upper plate portion spaced upwardly from the lower edge of the outer receptacle and provided with a supporting portion extending downwardly and outwardly from the peripheral edge of the plate portion and supported by the inwardly turned horizontal supporting flange, said downwardly turned portion provided with open spaces providing laterally and upwardly directed passages for the passage of hot gases from the under side of the heat diverting member into the interior of the outer receptacle, and an inner cooking receptacle removably positioned within and at the upper portion of the outer receptacle with the bottom of the former spaced a considerable distance from the plate portion of the heat diverting member providing a large space for complete circulation of hot gases around the bottom and lower side walls of the inner receptacle.

6. In a utensil of the class described, an outer supporting receptacle having a substantially vertical outer side wall provided with an inwardly turned, horizontal supporting flange at its lower edge, an inverted pan-shaped heat diverting member secured at its bottom edge around and under said supporting flange, the side walls of said pan-shaped heat diverting member being provided with a plurality of outwardly and upwardly directed ports, and an inner cooking receptacle removably positioned within and at the upper portion of the outer receptacle with the bottom of the former spaced a considerable distance from the bottom of the inverted pan-shaped heat diverting member providing a large space for complete circulation of hot gases around the bottom and lower side walls of the inner receptacle.

In testimony whereof, I have hereunto set my hand at San Diego, California, this 12th day of September, 1924.

WILLIAM R. DICK.